(12) United States Patent
Iimori

(10) Patent No.: US 7,197,339 B2
(45) Date of Patent: Mar. 27, 2007

(54) COMMUNICATION TERMINAL APPARATUS AND INCOMING CALL DETECTING METHOD

(75) Inventor: Eiji Iimori, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 571 days.

(21) Appl. No.: 10/793,216

(22) Filed: Mar. 5, 2004

(65) Prior Publication Data

US 2004/0259600 A1    Dec. 23, 2004

(30) Foreign Application Priority Data

Jun. 17, 2003    (JP) .............................. 2003-172001

(51) Int. Cl.
*H04B 1/38*    (2006.01)

(52) U.S. Cl. ................... 455/567; 455/458; 455/550.1; 455/574; 370/311; 370/335

(58) Field of Classification Search ............... 455/567, 455/458, 459, 550.1, 343.3, 437, 574, 434; 370/311, 335, 342, 441
See application file for complete search history.

(56) References Cited

U.S. PATENT DOCUMENTS 6,374,114 B1 *    4/2002    Kolev ........................ 455/458

2003/0008691 A1 *    1/2003    Chen et al. .................. 455/574

* cited by examiner

Primary Examiner—Melur Ramakrishnaiah
(74) Attorney, Agent, or Firm—Finnegan, Henderson, Farabow, Garrett & Dunner, L.L.P.

(57) ABSTRACT

The present invention is a communication terminal apparatus capable of making communication with a base station connectable to a communication network. The apparatus includes receiving means for receiving a radio signal transmitted from the base station and converting the radio signal into a baseband signal, detection means for detecting a timing to receive a ringing slot including information indicating presence and absence of an incoming call and being transmitted from the base station, first multiplication means for multiplying the baseband signal by a spreading code corresponding to the base station, at a timing based on the timing detected by the detection means, second multiplication means for multiplying the multiplication result of the first multiplication means by a second spreading code assigned to the communication terminal apparatus, and incoming call detection means for detecting the presence and the absence of the incoming call in accordance with whether the multiplication result of the first multiplication means and the multiplication result of the second multiplication means are in a common phase or opposite phases.

10 Claims, 8 Drawing Sheets

COMMUNICATION TERMINAL APPARATUS AND INCOMING CALL DETECTING METHOD

CROSS-REFERENCE TO RELATED APPLICATIONS

This application is based upon and claims the benefit of priority from prior Japanese Patent Application No. 2003-172001, filed Jun. 17, 2003, the entire contents of which are incorporated herein by reference.

BACKGROUND OF THE INVENTION

1. Field of the Invention

This invention relates to a communication terminal apparatus in a radio communication system such as, for example, a mobile telephone system.

2. Description of the Related Art

In the wideband code division multiple access (W-CDMA) system that is one of the mobile telephone systems, generation of an incoming call is monitored in the intermittent reception scheme.

In the intermittent reception scheme, a communication function is performed in a period in which a paging signal is transmitted intermittently from a base station to notify presence of an incoming call (ready state). An operating unit, a display unit and their related sections are operated in the other period (sleep state).

If it is detected that there is an incoming call from the paging signal in the ready state, intermittent reception is stopped and the communication function is continuously performed to make communication. If no incoming call from the paging signal is detected, a timer is reset, and a power supply of each unit is turned OFF such that the unit becomes in the sleep state again by the time when the paging signal is transmitted.

Thus, consumed power can be reduced by employing the intermittent reception scheme at the incoming call standby time.

However, it is requested to further enhance the effect obtained by the intermittent reception scheme, reduce the consumed power and extend the standby time.

BRIEF SUMMARY OF THE INVENTION

The present invention has been accomplished to solve the above-described problem. The object of the present invention is to provide a communication terminal apparatus and an incoming call detecting method enhancing the efficiency of the processings from the startup to the detection of the paging signal, reducing the time required for the processings, and reducing the consumed power.

According to an aspect of the present invention, there is provided a communication terminal apparatus capable of making communication with a base station connectable to a communication network. The apparatus comprises receiving means for receiving a radio signal transmitted from the base station and converting the radio signal into a baseband signal, detection means for detecting a timing to receive a ringing slot including information indicating presence and absence of an incoming call and being transmitted from the base station, first multiplication means for multiplying the baseband signal by a spreading code corresponding to the base station, at a timing based on the timing detected by the detection means, second multiplication means for multiplying the multiplication result of the first multiplication means by a second spreading code assigned to the communication terminal apparatus, and incoming call detection means for detecting the presence and the absence of the incoming call in accordance with whether the multiplication result of the first multiplication means and the multiplication result of the second multiplication means are in a common phase or opposite phases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
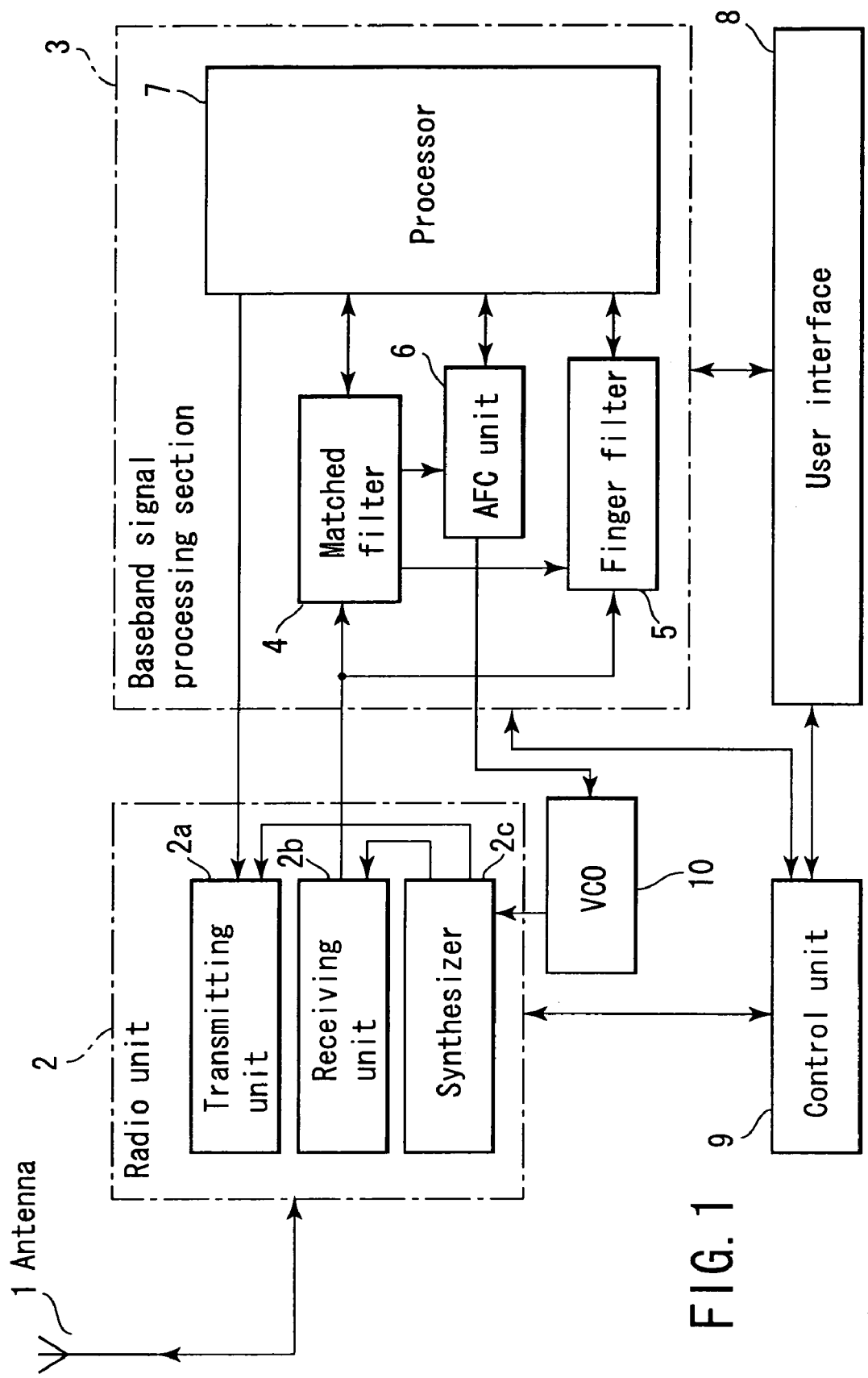
FIG. 1 is a block diagram showing a configuration of a communication terminal apparatus according to an embodiment of the present invention.

FIG. 1 is a block diagram of a mobile communication terminal according to an embodiment of the present invention. A W-CDMA mobile communication terminal is explained below.

Reference numeral 1 denotes an antenna and 2 denotes a radio unit. The radio unit 2 comprises a transmitting unit 2a, a receiving unit 2b and a synthesizer 2c. The transmitting unit 2a comprises a power amplifier, an up-converter, an orthogonal modulator and a D/A converter though not shown. The receiving unit 2*b* comprises a low-noise amplifier, a down-converter, an orthogonal demodulator and an A/D converter though not shown.

Reference numeral 3 denotes a baseband signal processing unit. The baseband signal processing unit 3 comprises a matched filter 4, a finger unit 5, an AFC (Auto Frequency Control) unit 6, a processor 7 and the like.

The processor 7 executes the processes of spread modulation, framing/deframing, error-correcting-coding/decoding, handover control and the like. Circuits individually executing these processes may be provided instead of the processor 7.

Reference numeral 8 denotes a user interface. The user interface 8 comprises a display unit, operation keys and an input/output interface. The user interface 8 is connected to the baseband signal processing unit 3 and a control unit 9.

The control unit 9 wholly controls each of the sections in the mobile communication terminal and is connected to the baseband signal processing unit 3 and the user interface 8.

The control unit 9 controls the radio unit 2 and the baseband signal processing unit 3 to detect a receiving timing of a slot into which a paging signal is inserted transmitted from a base station to the mobile communication terminal. The control unit 9 also controls the radio unit 2 and the baseband signal processing unit 3 to execute intermittent reception by which only the slot is received. If an incoming call for the mobile communication terminal is generated, the control unit 9 switches the intermittent reception to the continuous reception.

Reference numeral 10 denotes a local oscillator (VCO). The local oscillator 10 generates a local oscillation signal and outputs the generated signal to the synthesizer 2*c*. The synthesizer 2*c* generates a local signal which is frequency-adjusted on the basis of the local oscillation signal and outputs the local signal to the transmitting unit 2*a* and the receiving unit 2*b*.

Figure 2:
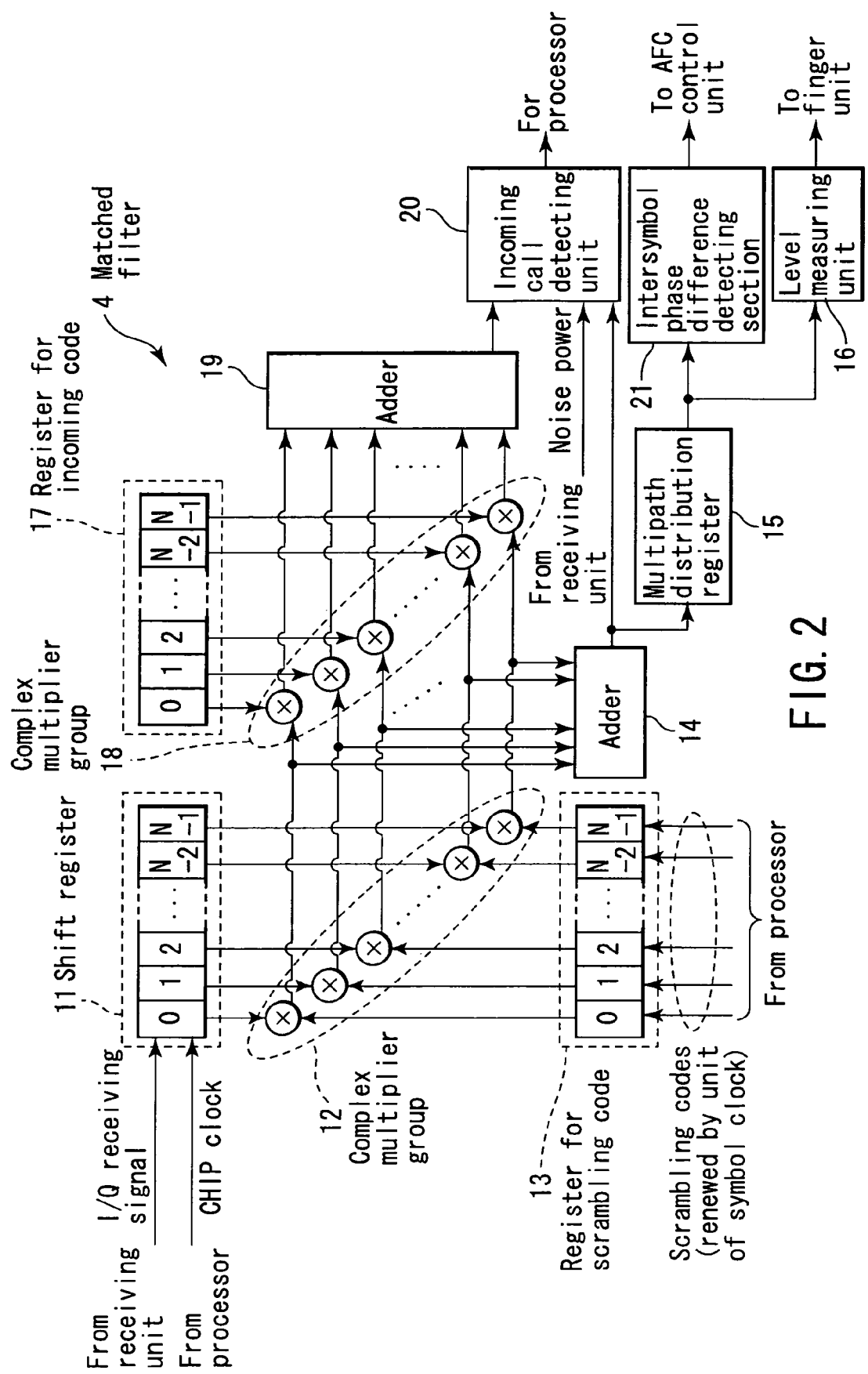
FIG. 2 is a block diagram showing a configuration of a matched filter in the communication terminal apparatus shown in FIG. 1.

FIG. 2 shows a configuration of the matched filter 4. The matched filter 4 comprises general constituent elements such as a shift register 11, a complex multiplier group 12, a register for scrambling code 13, an adder 14, a multipath distribution register 15, and a level measuring unit 16.

In addition, the matched filter 4 further comprises a register for incoming code 17, a complex multiplier group 18, an adder 19, an incoming call detecting unit 20, an intersymbol phase difference detecting unit 21.

In this embodiment, 1 symbol is spread-modulated by 256 chips. For this reason, value N of FIG. 2 is 256.

Figure 3:
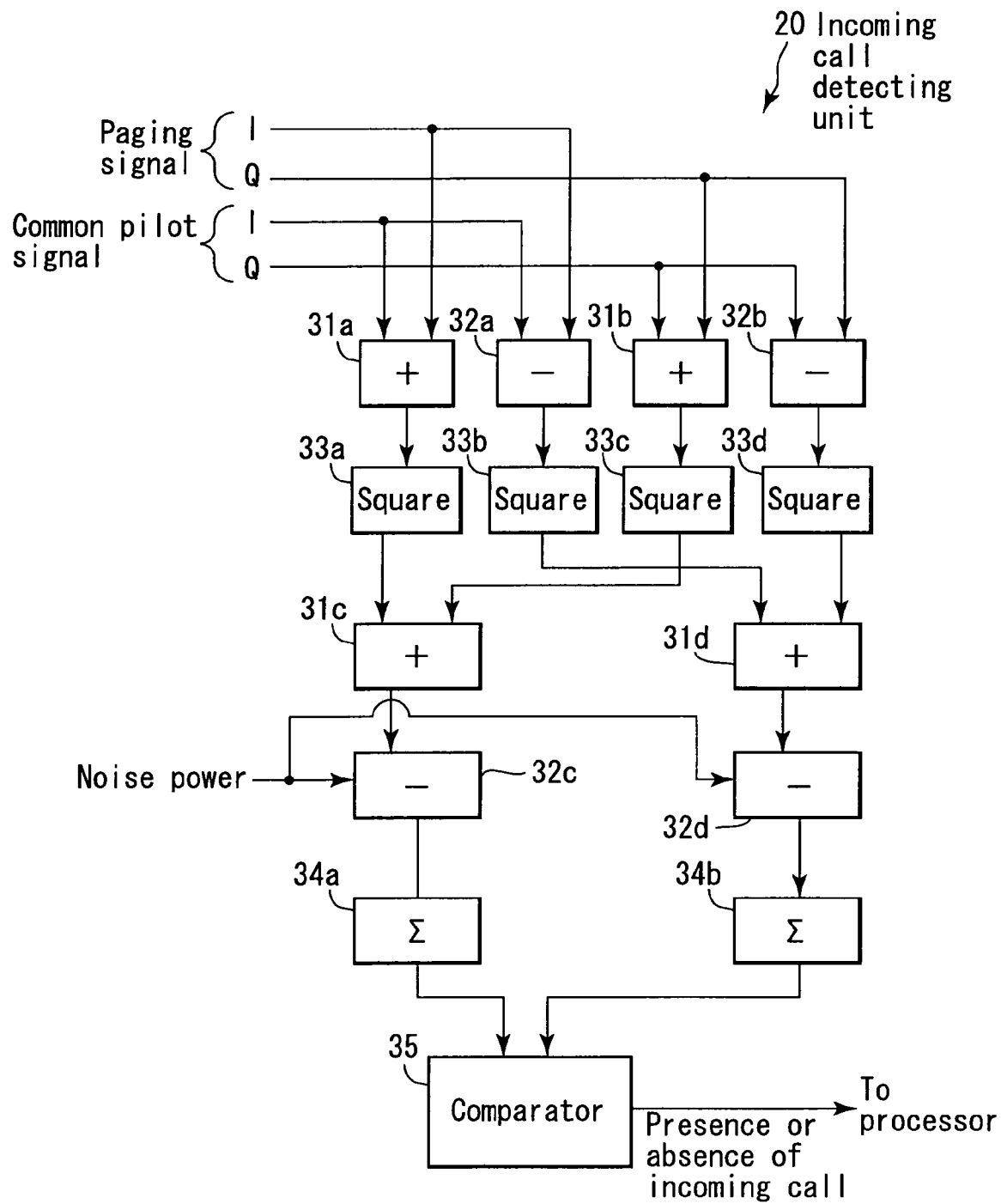
FIG. 3 is a block diagram showing an incoming call detecting unit in the matched filter shown in FIG. 2.

FIG. 3 is a block diagram showing a configuration of the incoming call detecting unit 20. Reference numerals 31*a*, 31*b*, 31*c* and 31*d* denote adders. 32*a*, 32*b*, 32*c* and 32*d* denote subtractors. 33*a*, 33*b*, 33*c* and 33*d* denote squaring operation units. 34*a* and 34*b* denote accumulators. 35 denotes a comparator.

Next, operations of the mobile communication terminal having the above-described structure will be explained. Prior to the operations to be explained, the control unit 9 has detected the receiving timing of the slot in which the paging signal is inserted, by controlling the radio unit 2 and the baseband signal processing unit 3. The control unit 9 also executes intermittent reception to receive only the slot by controlling the radio unit 2 and the baseband signal processing unit 3. The following explanations relate to the operations made during the reception of the slot.

In FIG. 1, a signal transmitted from a base station is received at the antenna 1 through a plurality of paths, i.e. a multipath. The received signal is subjected to orthogonal demodulation at the receiving unit 2*b* and is input to the matched filter 4 as I/Q receiving signal.

The I/Q receiving signal is sequentially read in the shift register 11 as shown in FIG. 2, synchronously with a clock signal supplied by unit of chip from the processor 7. On the other hand, scrambling codes which are the same as those used for spread modulation of a common pilot signal in a common pilot channel (CPICH) are set for respective symbol clocks, in the register for scrambling code 13, by the processor 7.

Figure 4:
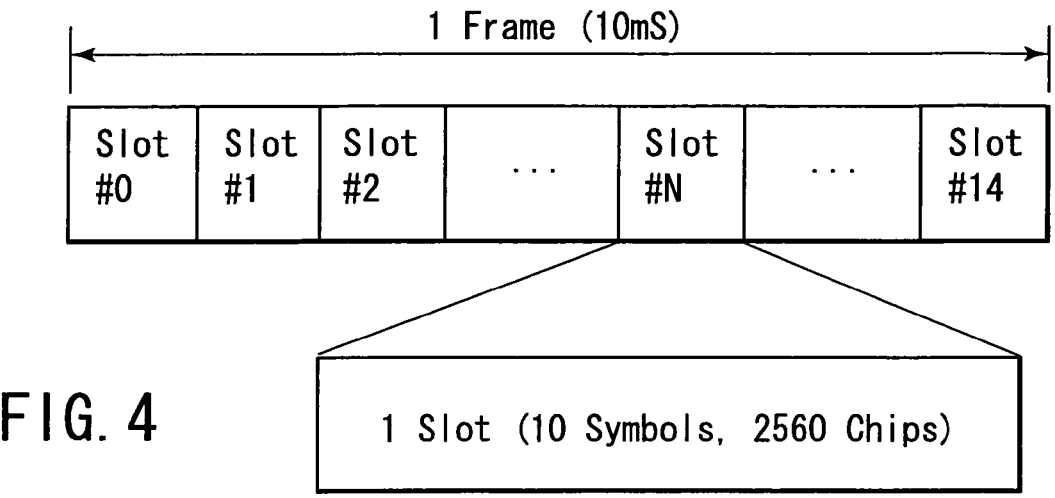
FIG. 4 is an illustration of a timing reference of a downstream link of a W-CDMA system.

The I/Q receiving signal which is set in the shift register 11 and the scrambling codes set in the register 13 are complex-multiplied by the complex multiplier group 12. A sum total of results of the complex multiplication is obtained by the adder 14. The sum total is output to the incoming call detecting unit 20 as a despread-demodulated common pilot signal. As 10 symbols of 1 slot are equivalent to 2560 chips as shown in FIG. 4, the common pilot signal includes 256 units of the sum during the time equivalent to 1 symbol.

Subsequently, an absolute value of the common pilot signal is found. The absolute values are paired for each of two successive symbols. Such pairs of absolute values are sequentially found and one of the pairs considered as a peak is detected. Thus, two timings suitable for re-synchronization of the common pilot signal are detected. If a multipath is provided, a re-synchronization timing of each path is detected by executing the same processing for each path.

The values of the sum total corresponding to each pair of timings are written in the multipath distribution register 15 for each multipath, in response to the values of the re-synchronization timings, as the common pilot signals re-synchronized from the first and second symbols.

On the other hand, the complex multiplier group 18 complex-multiplies multiplication results of the complex multiplier group 12 by incoming codes assigned to the mobile communication terminal. In other words, the complex multiplier group 18 complex-multiplies the results of the complex-multiplication obtained by the complex multiplier group 12 by the incoming codes which are fixed in the register 17. The adder 19 obtains results of the despread-demodulation of the paging signal by obtaining the sum total of the complex-multiplication results.

Next, the relationship in phase between the common pilot signal obtained by the adder 14 and the paging signal obtained by the adder 19 is determined by the incoming call detecting unit 20.

Figure 5:
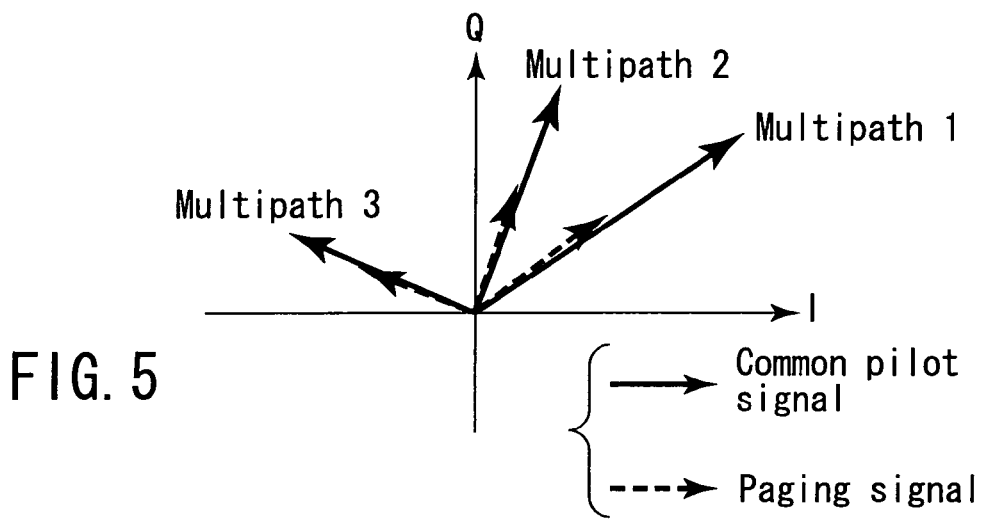
FIG. 5 is a graph of a relationship in phase between a common pilot signal and a paging signal when no incoming call exits.
Figure 6:
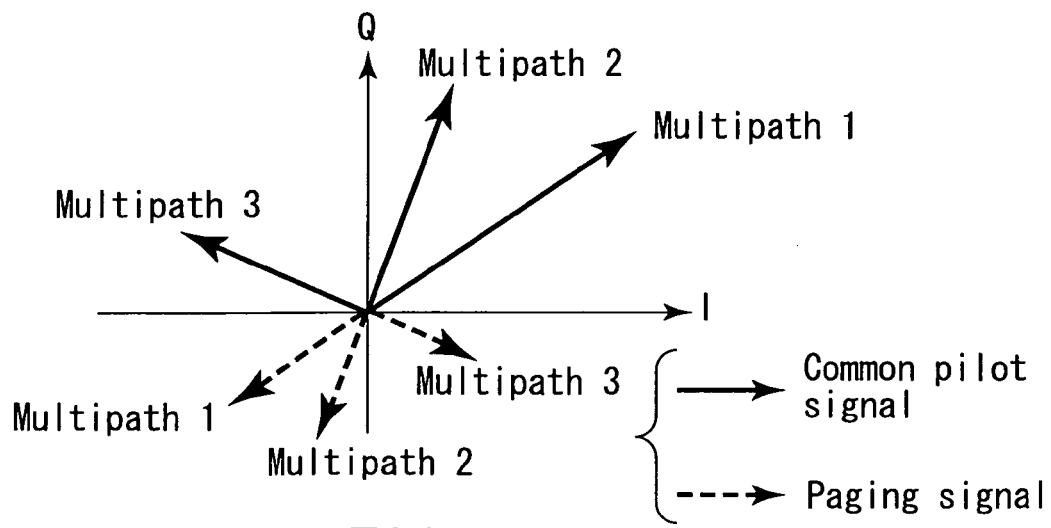
FIG. 6 is a graph of the relationship in phase between the common pilot signal and the paging signal when an incoming call exists.

FIG. 5 shows an example of the relationship in phase between the common pilot signal and the paging signal in a case where no incoming call exists. FIG. 6 shows an example of the relationship in phase therebetween in a case where an incoming call exists. In each of the examples of FIGS. 5 and 6, three multipaths exist.

Multipaths 1, 2 and 3 are different in receiving signal phase as they are different in propagation path length from the base station to the mobile communication terminal. However, the relationship in phase between the common pilot signal and the paging signal in each of the multipaths is maintained as it is in the state when they have been transmitted from the base station.

Thus, as far as the same multipath is concerned, the common pilot signal and the paging signal are in the same phase when "no incoming call exists" or opposite phases when the "incoming call exists". If two signal vectors are in the same phase, an absolute value of a vector of sum of the signals is greater than an absolute value of difference between the signals. However, if they are in opposite phases, the absolute value of the difference vector is greater than that of the sum vector. The incoming call detecting unit 20 detects the presence or absence of the incoming call with the constitution shown in FIG. 3, by noticing the difference in magnitude.

Figure 7:
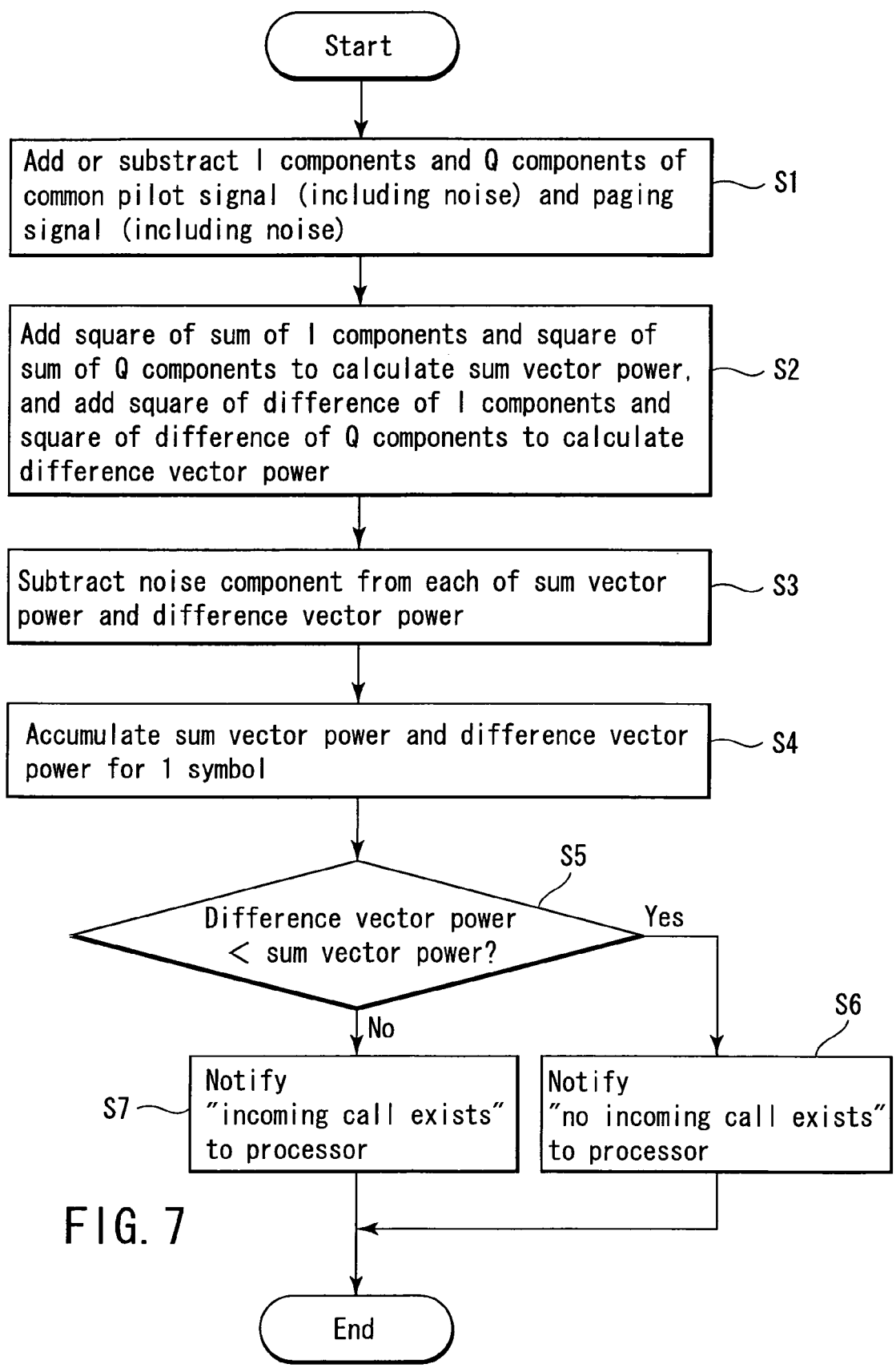
FIG. 7 is a flowchart of operations of the incoming call detecting unit shown in FIG. 3.

Next, operations of detecting the presence or absence of the incoming call by the incoming call detecting unit 20 will be explained. FIG. 7 is a flowchart of the operations of the incoming call detecting unit 20.

The adders 31a and 31b execute addition of I or Q components of the common pilot signal and the paging signal. The subtractors 32a and 32b execute subtraction of the I or Q components of the signals.

(Step S1) The adder 31a finds the sum of the I component of the common pilot signal and the I component of the paging signal. The adder 31b finds the sum of the Q component of the common pilot signal and the Q component of the paging signal. The subtractor 32a finds the difference between the I component of the common pilot signal and the I component of the paging signal. The subtractor 32b finds the difference between the Q component of the common pilot signal and the Q component of the paging signal.

(Step S2) The operation units 33a and 33c find squares of the sums obtained in step S1, respectively. The results are added by the adder 31c. The addition result is a square of the absolute value of the sum vector of the common pilot signal and the paging signal, i.e. a power of the sum vector of the signals. The operation units 33b and 33d find squares of the differences obtained in step S1, respectively. The results are added by the adder 31d. The addition result is a square of the absolute value of the difference vector of the common pilot signal and the paging signal, i.e. a power of the difference vector of the signals.

(Step S3) The subtractor 32c subtracts noise power from the power of the sum vector obtained in step S2. The subtractor 32d subtracts noise power from the power of the difference vector obtained in step S2.

(Step S4) The accumulator 34a accumulates the subtraction result of the subtractor 32c for two symbols. The accumulator 34b accumulates the subtraction result of the subtractor 32d for two symbols. These accumulation results are the values obtained by summing up the powers of the sum vector and the difference vector of the signals from which the noise components are removed, for two symbols. For this reason, the difference in magnitude between the output of the accumulator 34a and the output of the accumulator 34b is determined in accordance with the presence or absence of the incoming call.

(Step S5) The comparator 35 determines which of the output of the accumulator 34a and the output of the accumulator 34b is greater, i.e. which of the difference vector power and the sum vector power is greater. If the sum vector power is greater than the difference vector power, the process proceeds to step S6. If the difference vector power is greater than the sum vector power, the process proceeds to step S7.

(Step S6) The comparator 35 notifies "no incoming call exists" to the processor 7.

(Step S7) The comparator 35 notifies "incoming call exists" to the processor 7.

The processor 7 determines whether or not the sleep state should be set, in response to the notification about "incoming call exists/no incoming call exists".

Next, use of the common pilot signal written in the multipath distribution register 15 will be explained. The detecting unit 21 detects the phase difference between the first symbol and the second symbol, on the basis of the peak value of the common pilot signal written in the multipath distribution register 15.

If the detected phase difference value is grater than a predetermined reference value, the detecting unit 21 assumes that the difference between a local oscillation frequency and a frequency of the base station is great and determines that the AFC is needed. The detecting unit 21 notifies the determination result to the AFC unit 6.

After receiving the determination result indicating that the AFC is needed, from the detecting unit 21, the AFC unit 6 controls the local oscillator 10 to execute the AFC to synchronize a frequency of a local oscillation signal generated by the local oscillator 10 with the frequency of the base station. Prior to the execution of the AFC, the processor 7 has started up the AFC unit 6 in view of the fact that the detecting unit 20 has detected the incoming call.

The level measuring unit 16 measures the level of the peak value of the common pilot signal. The measurement result and the timing information by which the peak value can be obtained are used for the operation of the finger unit 5.

As described above, the intersymbol phase difference is detected simultaneously with the re-synchronization of the common pilot signal and the detection of the paging signal, in the mobile communication terminal of the present invention. The necessity of the AFC can be therefore determined in a short time.

Figure 8:
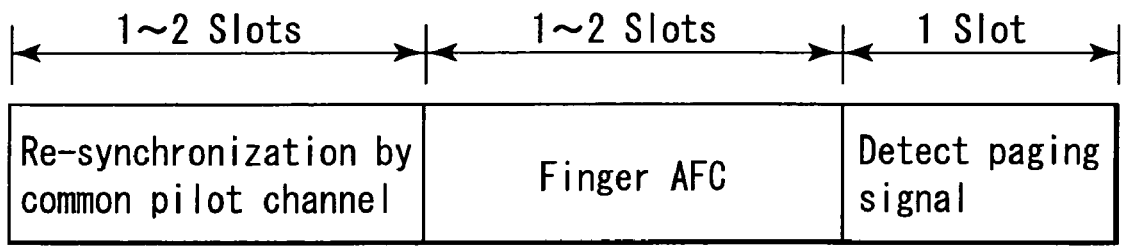
FIG. 8 is an illustration of a time required to detect an incoming call by prior art.
Figure 9:
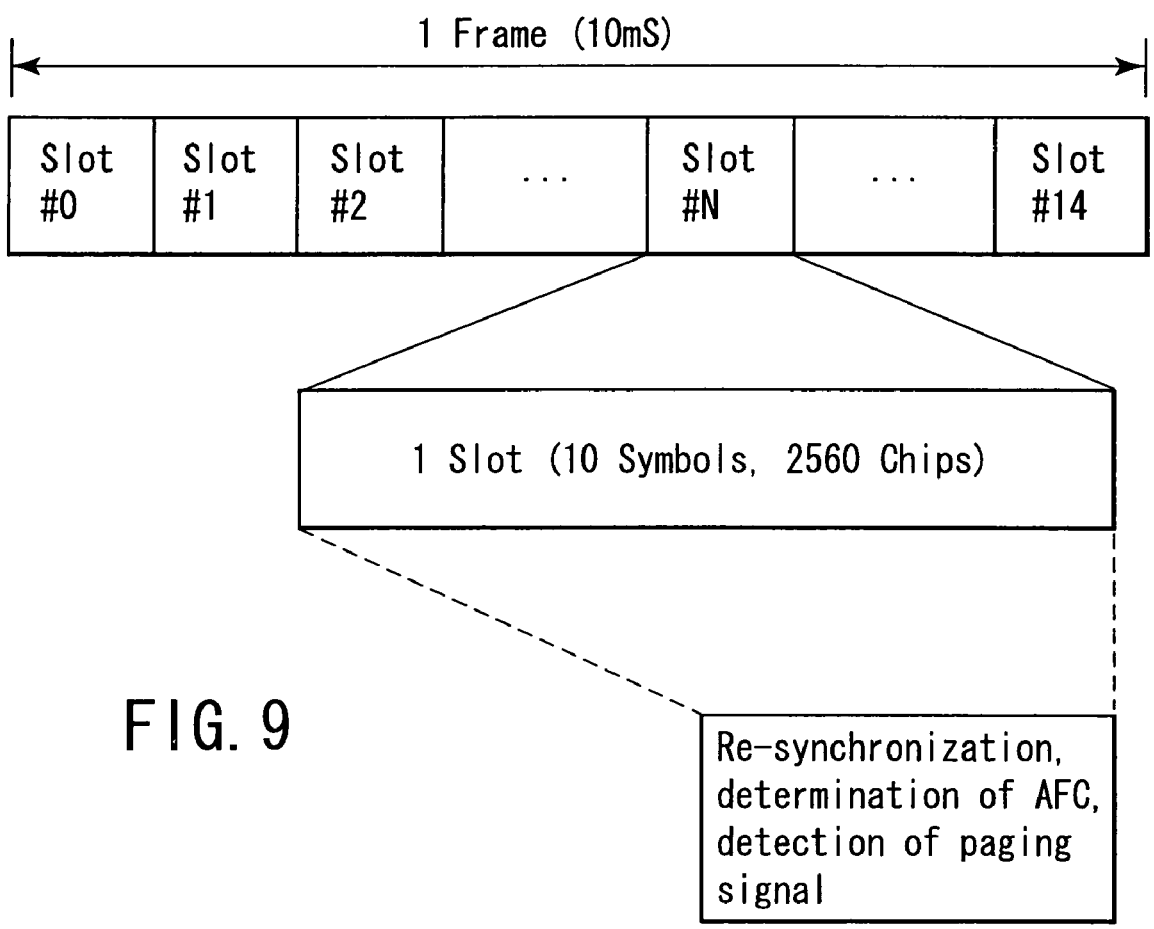
FIG. 9 is an illustration of a time required to detect an incoming call by the communication terminal apparatus of the present invention.

For this reason, the time equivalent to 3 to 4 slots is required for detection of the paging signal, in the prior art, as shown in FIG. 8. In the mobile communication terminal of the present invention, however, such a time is not required, and all of the re-synchronization, detection of the paging signal, and the determination of necessity of the AFC can be processed within the time width of 1 slot as shown in FIG. 9.

Thus, according to the mobile communication terminal of the present invention, the efficiency of W-CDMA intermittent reception can be enhanced, consumption of the battery can be restricted, and the standby time can be extended.

Figure 10:
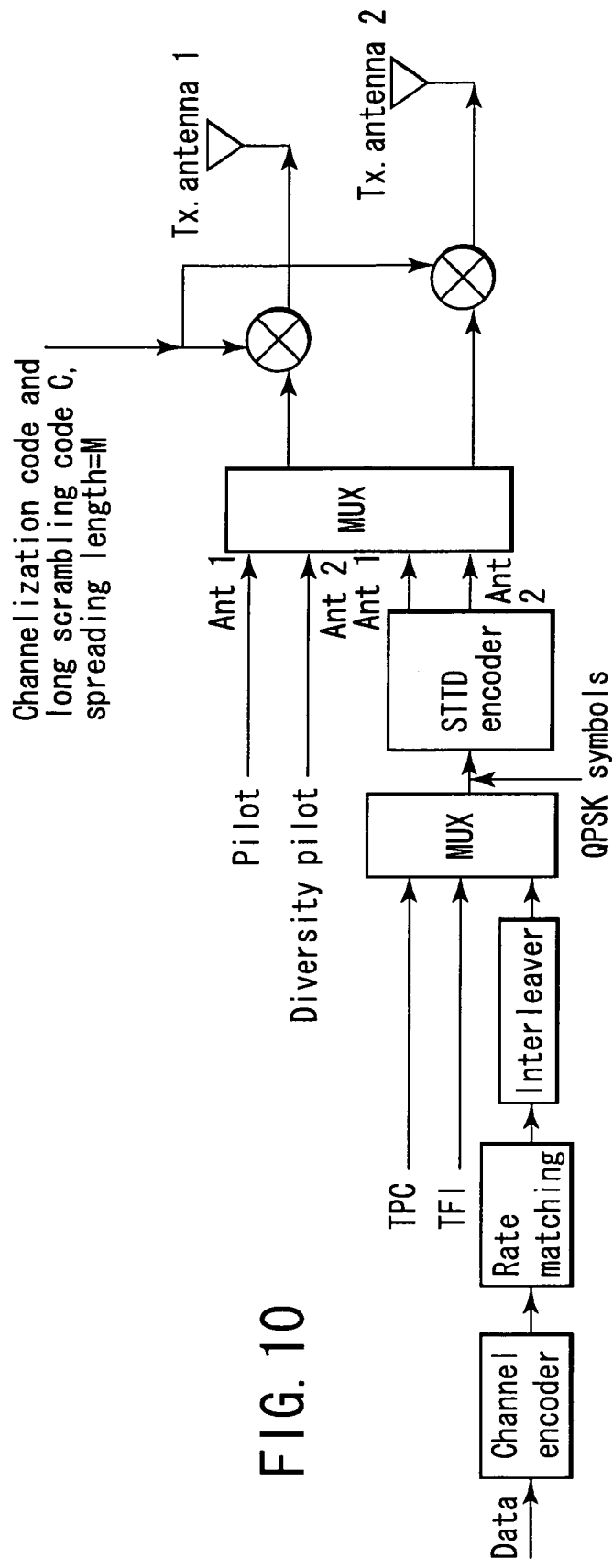
FIG. 10 is a diagram showing a configuration of a base station in an STTD scheme.

The present invention is not limited to the above-described embodiment. For example, the present invention can correspond to a base station in the scheme of STTD (Space-Time Transit Diversity) as shown in FIG. 10.

Figure 11:
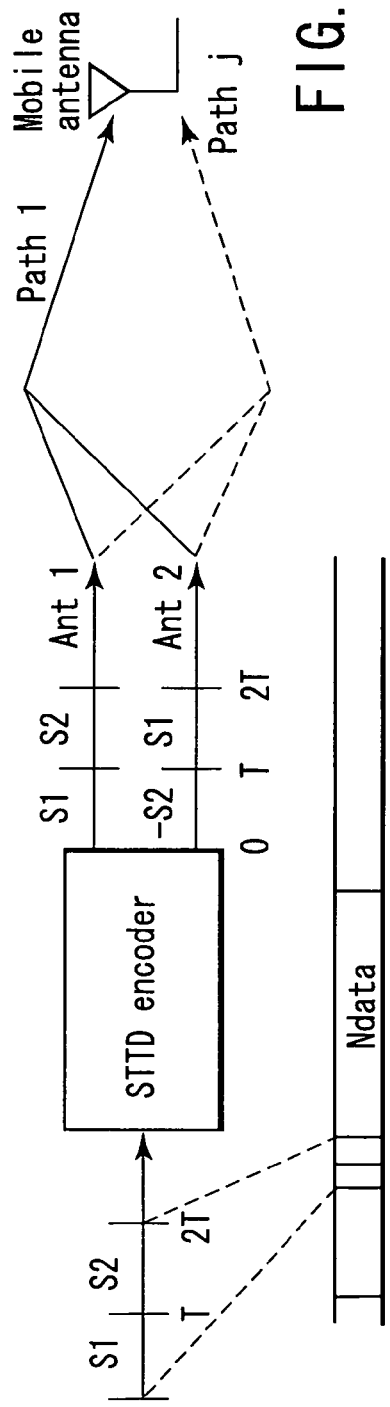
FIG. 11 is an illustration of a signal transmitted from the base station shown in FIG. 10.

The base station in the STTD scheme transmits signals from two antennas as shown in FIG. 11. Phases of the transmitted signals are different from each other.

The common pilot signal and the paging signal transmitted from a first antenna, of the two antennas, are transmitted with the same relationship in phase as that explained in the embodiment. When the incoming call exists, the paging signal is transmitted from a second antenna, with the phase proceeding at 90 degrees from the common pilot signal. When no incoming call exists, the paging signal is transmitted therefrom, with the phase delayed at 90 degrees from the common pilot signal. The common pilot signal and the paging signal transmitted from the second antenna are transmitted while their phases are reversed by unit of symbol.

Figure 12:
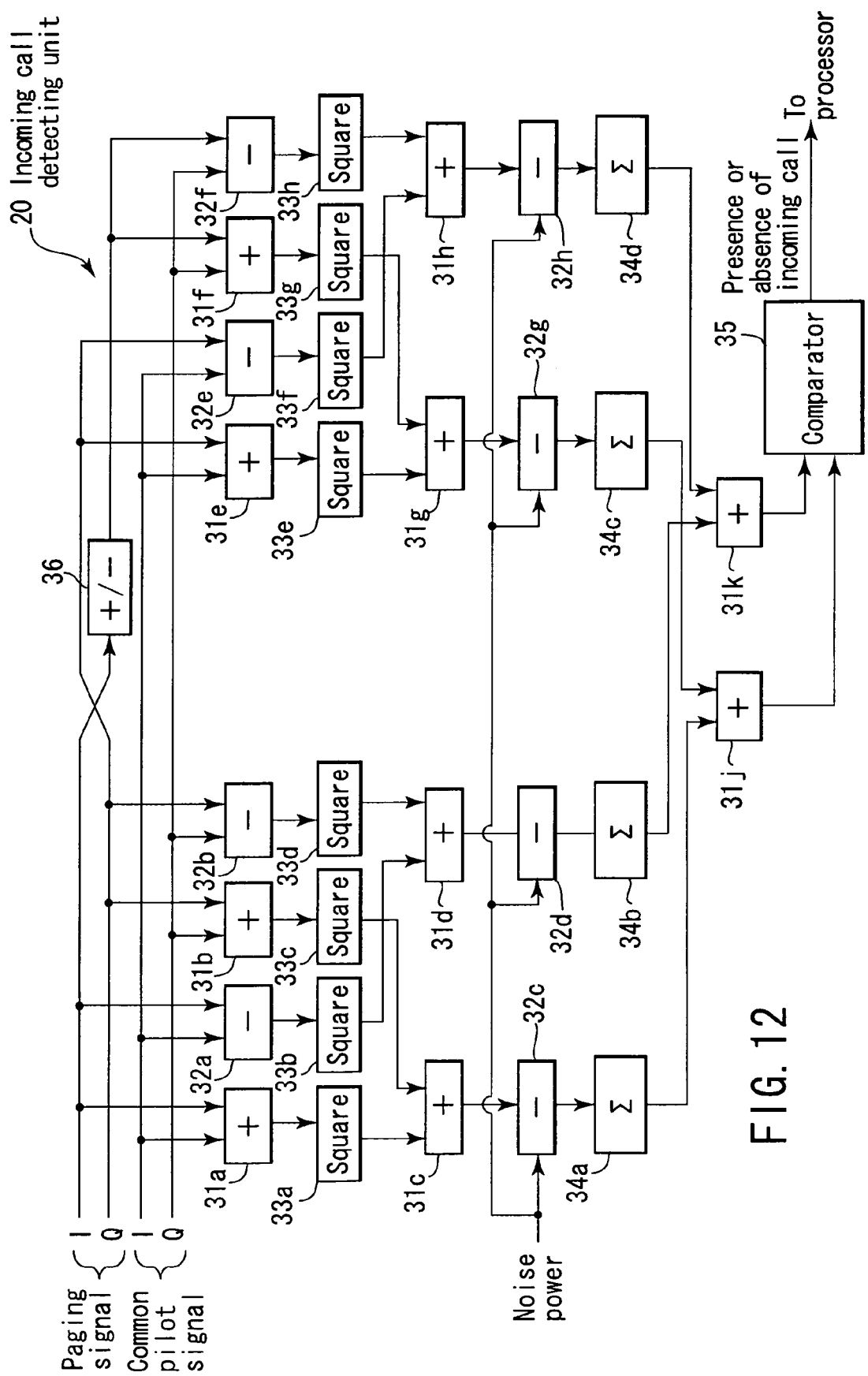
FIG. 12 is a block diagram showing a configuration of an incoming call detecting unit corresponding to the base station shown in FIG. 10.

To respond to such a base station in the STTD scheme, the detecting unit 20 in the mobile communication terminal of the present invention has a configuration shown in FIG. 12 instead of the configuration shown in FIG. 3.

The structure of the detecting unit 20 shown in the left part of FIG. 12, i.e. the structure composed of the adders 31a to 31d, the subtractors 32a to 32d, the squaring operation units 33*a* to 33*d* and the accumulators 34*a* and 34*b* is the same as that in FIG. 3. They receive the signal transmitted from the first antenna.

In the structure shown in the left part of FIG. 12, the power of the sum vector and the power of the difference vector, about the common pilot signal and the paging signal transmitted from the first antenna, are summed up for 2 symbols.

On the other hand, a structure of the detecting unit 20 shown in the right part of FIG. 12, i.e. a structure composed of adders 31*e* to 31*h*, subtractors 32*e* to 32*h*, squaring operation units 33*e* to 33*h* and accumulators 34*c* and 34*d* is similar to that in FIG. 3, but is different in view of a feature that a code converter 36 is provided to make the I and Q components of the paging signal intersect. In this different structure, the phase of the paging signal transmitted from the second antenna is turned at −90 degrees such that the relationship in phase between the paging signal and the common pilot signal becomes the same as the relationship in phase between the paging signal and the common pilot signal transmitted from the first antenna.

In the structure shown in the right part of FIG. 12, the power of the sum vector and the power of the difference vector, about the common pilot signal and the paging signal transmitted from the second antenna, are summed up for 2 symbols.

The operation results of the right structure and those of the left structure are added by adders 31*j* and 31*k*. The comparator 35 compares the addition results and determines the presence or absence of the incoming call.

Use of the incoming call detecting unit 20 thus formed can correspond to the base station in the STTD scheme, enhance the efficiency of the W-CDMA intermittent reception, restrict the consumption of the battery and extend the standby time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication terminal apparatus capable of making communication with a base station connectable to a communication network, the apparatus comprising:

receiving means for receiving a radio signal transmitted from the base station and converting the radio signal into a baseband signal;

detection means for detecting a timing to receive a ringing slot including information indicating presence and absence of an incoming call and being transmitted from the base station;

first multiplication means for multiplying the baseband signal by a spreading code corresponding to the base station, at a timing based on the timing detected by the detection means;

second multiplication means for multiplying the multiplication result of the first multiplication means by a second spreading code assigned to the communication terminal apparatus; and incoming call detection means for detecting the presence and the absence of the incoming call in accordance with whether the multiplication result of the first multiplication means and the multiplication result of the second multiplication means are in a common phase or opposite phases.

2. The apparatus according to claim 1, wherein the incoming call detecting means comprises:

first operation means for finding an absolute value of a sum vector of the multiplication result of the first multiplication means and the multiplication result of the second multiplication means;

second operation means for finding an absolute value of a difference vector of the multiplication result of the first multiplication means and the multiplication result of the second multiplication means; and phase determination means for determining whether the multiplication result of the first multiplication means and the multiplication result of the second multiplication means are in a common phase or opposite phases, in accordance with which of the absolute value found by the first multiplication means and the absolute value found by the second multiplication means is greater.

3. The apparatus according to claim 2, wherein the phase determination means comprises:

first operation means for finding an absolute value of a sum vector of the multiplication result of the first multiplication means and the multiplication result of the second multiplication means;

second operation means for finding an absolute value of a difference vector of the multiplication result of the first multiplication means and the multiplication result of the second multiplication means;

phase rotation means for rotating a phase of the multiplication result of the second multiplication means at 90 degrees;

third operation means for finding an absolute value of a sum vector of the multiplication result of the first multiplication means and the multiplication result of the second multiplication means phase-rotated by the phase rotation means;

fourth operation means for finding an absolute value of a difference vector of the multiplication result of the first multiplication means and the multiplication result of the second multiplication means phase-rotated by the phase rotation means;

first addition means for adding the absolute value found by the first operation means and the absolute value found by the third operation means;

second addition means for adding the absolute value found by the second operation means and the absolute value found by the fourth operation means; and determination means for determining whether the multiplication result of the first multiplication means and the multiplication result of the second multiplication means are in a common phase or opposite phases, in accordance with which of the addition result of the first addition means and the addition result of the second addition means is greater.

4. The apparatus according to any one of claims 1 to 3, further comprising frequency control means for controlling a frequency of a local oscillation signal used by the receiving means, in accordance with the multiplication result of the first multiplication means.

5. The apparatus according to claim 4, wherein the frequency control means controls the frequency of the local oscillation signal used by the receiving means, in accordance with a phase difference between two samples of the multiplication result of the first multiplication means.

6. An incoming call detecting method of a communication terminal apparatus capable of making communication with a base station connectable to a communication network, the method comprising:
- (a) receiving a radio signal transmitted from the base station and converting the radio signal into a baseband signal;
- (b) detecting a timing to receive a ringing slot including information indicating presence and absence of an incoming call and being transmitted from the base station;
- (c) multiplying the baseband signal by a spreading code corresponding to the base station, at a timing based on the timing detected by the step (b);
- (d) multiplying the multiplication result of the step (c) by a second spreading code assigned to the communication terminal apparatus; and
- (e) detecting the presence and the absence of the incoming call in accordance with a fact that the multiplication result of the step (c) and the multiplication result of the step (d) are in a common phase or opposite phases.

7. The method according to claim 6, wherein the step (e) includes:
- (f) finding an absolute value of a vector representing a sum of the multiplication result of the step (c) and the multiplication result of the step (d);
- (g) finding an absolute value of a vector representing a difference between the multiplication result of the step (c) and the multiplication result of the step (d); and
- (h) determining whether the multiplication result of the step (c) and the multiplication result of the step (d) are in a common phase or opposite phases, in accordance with which of the absolute value found by the step (f) and the absolute value found by the step (g) is greater.

8. The method according to claim 7, wherein the step (h) includes:
- (i) finding an absolute value of a vector representing a sum of the multiplication result of the step (c) and the multiplication result of the step (d);
- (j) finding an absolute value of a vector representing a difference between the multiplication result of the step (c) and the multiplication result of the step (d);
- (k) rotating a phase of the multiplication result of the step (d) at 90 degrees;
- (l) finding an absolute value of a vector representing a sum of the multiplication result of the step (c) and the multiplication result of the step (d) phase-rotated at the step (k);
- (m) finding an absolute value of a vector representing a difference between the multiplication result of the step (c) and the multiplication result of the step (d) phase-rotated at the step (k);
- (n) adding the absolute value found at the step (i) and the absolute value found at the step (l);
- (o) adding the absolute value found by the step (j) and the absolute value found by the step (m); and
- (p) determining whether the multiplication result of the step (c) and the multiplication result of the step (d) are in a common phase or opposite phases, in accordance with which of the addition result of the step (n) and the addition result of the step (o) is greater.

9. The method according to any one of claims 6 to 8, further comprising
- (q) controlling a frequency of a local oscillation signal used at the step (a), in accordance with the multiplication result of the step (c).

10. The method according to claim 9, wherein the step (q) includes
- (r) controlling the frequency of the local oscillation signal used at the step (a), in accordance with a phase difference between two samples of the multiplication result of the step (c).

* * * * *